May 18, 1954  R. H. BALDWIN ET AL  2,678,907
CONTROLLING THE FLOW OF TETRAETHYL LEAD REACTION MASSES
Filed April 8, 1952
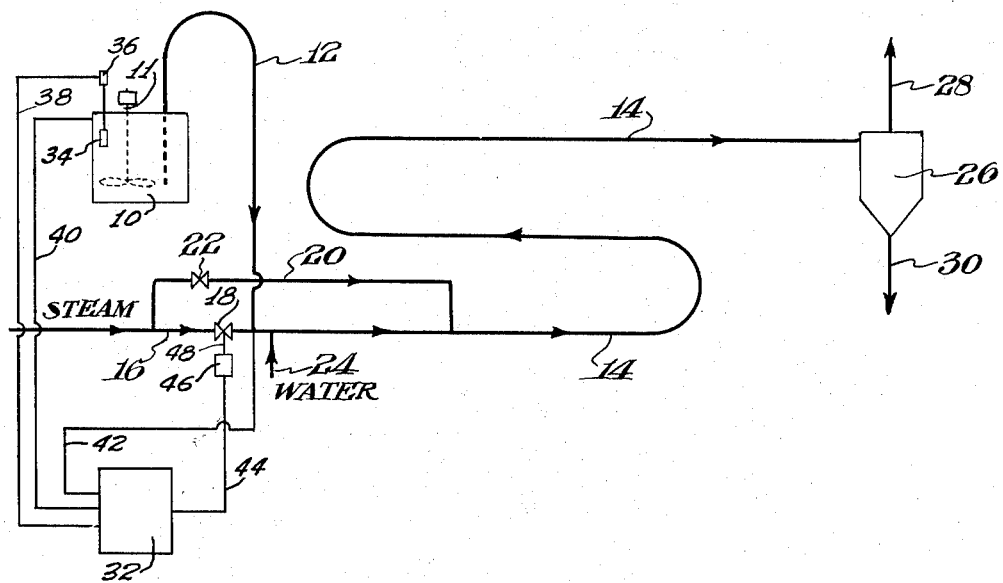
INVENTORS
ROBERT H. BALDWIN
BY & ROBERT E. BLEY
*Edwin E. Woodhouse*
ATTORNEY.

Patented May 18, 1954

2,678,907

UNITED STATES PATENT OFFICE 2,678,907

CONTROLLING THE FLOW OF TETRAETHYL LEAD REACTION MASSES

Robert H. Baldwin, Chadds Ford, Pa., and Robert E. Bley, New Castle, Del., assignors to E. I. du Pont de Nemours & Company, Wilmington, Del., a corporation of Delaware Application April 8, 1952, Serial No. 281,234

9 Claims. (Cl. 202—46)

This invention relates to a process for controlling the flow of tetraethyl lead reaction masses through pipes.

For many years, tetraethyl lead has been manufactured by the reaction of ethyl chloride on lead-monosodium alloy at temperatures of from about 45° C. to about 80° C. in batches in autoclaves. Theoretically, 1 part by weight of ethyl chloride is required for 3.57 parts of lead-monosodium alloy. However, in practice, a small excess of ethyl chloride has been employed, usually, about 60% by weight. After the reaction, most of the excess ethyl chloride (about 95% thereof) has been distilled off at atmospheric pressure, the reaction mass drowned in water, and the mixture of reaction mass and water transferred to a still where steam was passed through it to distill off the tetraethyl lead under atmospheric pressure.

During the reaction, the sodium of the alloy is mostly converted to sodium chloride, about 25% of the lead in the alloy is converted to tetraethyl lead, and the remainder of the lead is converted to metallic lead in finely-divided form and a very small proportion of lead chloride. The particles of lead have an average diameter of less than 0.1 inch and are very readily oxidized, whereby the surfaces of the lead particles become coated with lead oxide, particularly during the drowning and distillation steps. Usually, the lead oxide will be present in an amount of from about 2% to about 10% by weight of the lead, frequently as high as about 20% and, in extereme cases, as high as about 30%. Such lead oxide is objectionable because of the difficulty and expense of converting it to lead.

More recently continuous processes for manufacturing tetraethyl lead have been developed, in which molten lead-monosodium alloy is continously quenched in from 1 to 9 parts of liquid ethyl chloride so as to produce a slurry of the alloy in liquid ethyl chloride, and such slurry is caused to react in a reaction chamber maintained at a temperature of from about 80° C. to about 127° C. and under a pressure of from about 107 to about 290 pounds per square inch absolute, while continuously flowing the slurry through a reaction chamber at such temperatures and pressures until the reaction is substantially complete, and continuously removing the resultant reaction mixture from the reaction chamber.

The reaction mixtures, obtained by the continuous processes, are similar to those obtained by the older batch process, except that they contain much larger proportions of ethyl chloride, usually contain lesser amounts of lead oxide, and the lead particles are of a more uniform and smaller size. The previously employed batch steam distillation process is not adapted for continuous operation or for separating ethyl chloride or tetraethyl lead from continuously produced reaction masses.

Frederick G. W. Rehm, Jr. and William W. Wingate, in application Serial No. 272,454, filed February 19, 1952, have disclosed a new and improved process for separating tetraethyl lead and ethyl chloride from the reaction masses, particularly the reaction masses obtained by the continuous processes and which consist essentially of 1 part by weight of liquid tetraethyl lead, from about 1.95 to about 2.4 parts by weight of finely-divided lead, from about 0.7 to about 0.9 part by weight of sodium chloride, and from about 5 to about 20 parts by weight of liquid ethyl chloride. According to their process, the reaction mass is passed to the entrance of a stripper tube where it is mixed with from 0.2 to about 5 parts by weight of water for each part of lead, with from about 0.001 to about 1 part by weight of a still aid for each part of lead, and with saturated steam at a temperature of from about 125° C. to about 188° C. in a proportion of from 0.09 to about 3 parts by weight for each part of ethyl chloride plus from 0.06 to about 2.4 parts by weight for each part of tetraethyl lead, the rates of feed and the proportions being regulated so that the mixture at the entrance to the stripper tube is at an initial pressure of from 35 to 175 pounds per square inch absolute and an initial temperature of from about 95° C. to about 150° C.; passing such mixture through the stripper tube, having a smooth, unobstructed, uniform bore of from $\frac{1}{4}$ to about 10 inches in diameter and of from 50 to about 2,000 tube diameters in length and which is devoid of bends having a radius of curvature of less than 5 tube diameters, with annular flow at a vapor velocity of from about 100 to 700 feet per second with a pressure drop of at least 20 pounds per square inch but not to below substantially 15 pounds per square inch absolute and with a discharge temperature of from about 80° C. to about 140° C.; then discharging the mixture from the tube and separating the vapor phase from the liquid phase, the vapor phase being composed of steam and nearly all of the tetraethyl lead and the ethyl chloride.

While the reaction mass may be fed directly to the stripper tube from the reaction vessel, it preferably is discharged into a temporary storage tank where it is agitated and maintained at the temperature and pressure of the reactor. Unavoidably, the discharge from the reactor will fluctuate somewhat, whereas, for practical operation, it is desirable to feed the reaction mass to the stripper tube at a substantially uniform controlled rate. By discharging the reaction mass from the reactor into the temporary storage tank so as to form a body of reaction mass therein, a more uniform feed of reaction mass, from the tank to the stripper tube, can be obtained.

Even with the temporary storage tank, the feed of reaction mass to the stripper tube has not been constant. Fluctuations, in the discharge of the reaction mass from the reactor, cause variations in the depth of the body of reaction mass in the tank, resulting in variations in the rate of feed of the reaction mass to the stripper tube. While such variations in the rate of feed to the stripper tube are not as great as the fluctuations in the discharge from the reactor, they are still great enough to cause difficulty in the efficient operation of the stripper tube and are objectionable. Frequently, the rate of discharge of the reaction mass from the reactor temporarily will be greater or less than the rate at which it will flow from the tank to the stripper tube under the pressures being employed, whereby the depth of the reaction mass in the tank will tend to be increased above or decreased below safe levels.

Therefore, further control of the rate of feed of reaction mass from the temporary storage tank to the stripper tube is desirable and important. Such control cannot be obtained by ordinary means, such as pumps, valves, and the like. Both the finely-divided lead and the tetraethyl lead have an extreme tendency to separate from the reaction mass and, in addition, the finely-divided lead tends to agglomerate into large refractory lumps and to settle out rapidly and form hard deposits which are difficult to redisperse. The tendency for the lead to separate and agglomerate is particularly serious when the flowing reaction mass encounters obstructions or sharp edges or if the flow is constricted, stopped or suddenly changed in direction. Hence, although the reaction mass may be transported by gravitational flow through pipes of smooth interior bore without sharp bends, it is impractical to use conventional pumps or valves for the control of such flow, since they become plugged almost at once by the solids.

It is an object of the present invention to provide a new and improved process for controlling the flow of tetraethyl lead reaction masses through pipes. Another object is to provide a process for controlling the flow of such tetraethyl lead reaction masses from a body thereof to a stripper tube. A particular object is to control the flow of such reaction masses from the temporary storage tank to the stripper tube in the hereinbefore described process of Rehm, Jr. and Wingate. Further objects are to provide a process of the above character which is simple, efficient and economical to operate. Other objects are to advance the art. Still other objects will appear hereinafter.

The above and other objects may be accomplished in accordance with our invention which comprises controlling, by varying the rate of flow of at least one member of the group of steam and water into the entrance of the stripper tube, the flow of a tetraethyl lead reaction mass continuously from a body thereof under pressure, which fluctuates in depth, through a feed pipe, which has a smooth, unobstructed, uniform bore and is devoid of sharp bends, and into the entrance of a stripper tube at a lower pressure where it is mixed with water and saturated steam and the mixture is caused to flow through the stripper tube under conditions of annular flow.

We have found that, by such method, we can accurately control the flow of reaction mass from the body thereof to the stripper tube so as to compensate for abnormal fluctuations in the depth of the body of reaction mass ordinarily encountered, and maintain the depth of the body of reaction mass between reasonably safe limits, whereby efficient operation of the stripper tube can be continued over long periods of time without interruption even though the rate of production of the reaction mass varies over a wide range. Our invention is particularly designed and adapted for use in connection with the process disclosed in the application of Rehm, Jr. and Wingate, Serial No. 272,454, hereinbefore referred to.

Annular flow, sometimes called two-phase flow, is that which is obtained when a liquid, which may contain dispersed solids, and a sufficiently large volume of vapor are caused to flow through a pipe or tube at high velocities whereby the liquid, including any dispersed solids, assumes the form of an annular stream flowing along the walls of the tube and the vapor flows through the center of the tube in the passage formed by the annular stream of liquid.

The reaction masses may be those disclosed by Rehm, Jr. and Wingate. Preferably, the reaction masses are those produced by continuous processes and consist essentially of 1 part by weight of liquid tetraethyl lead, from about 1.95 to about 2.4 parts by weight of finely-divided lead (including lead oxide and traces of lead salts), from about 0.7 to about 0.9 part by weight of sodium chloride, and from about 5 to about 20 parts by weight of liquid ethyl chloride.

Preferably, the body of reaction mass will be in a temporary storage tank or hold-up vessel, in which the body of reaction mass is produced and maintained by discharge from a continuously operated reactor. Such body of reaction mass will be agitated so as to maintain the solids uniformly suspended in the liquids, and, ordinarily, will be maintained at the temperature and pressure at which the reaction mass is produced in the reactor. The temperatures and pressures in the tank may be from about 80° C. to about 127° C. and from about 107 to about 290 pounds per square inch absolute (p. s. i. a.), but preferably will be from about 90° C. to about 110° C. and from about 137 p. s. i. a. to about 210 p. s. i. a. The pressures in the tank are correlated with the temperatures so as to maintain the ethyl chloride in liquid form.

The stripper tube is a tube having a smooth, unobstructed, uniform bore of from ¼ to about 10 inches in diameter and of from 50 to about 2,000 tube diameters in length and which is devoid of bends having a radius of curvature of less than 5 tube diameters. The reaction mass is mixed with water and saturated steam, and the mixture is caused to flow through the tube under conditions of annular flow so that the tetraethyl lead and the ethyl chloride are vaporized and carried out of the annular stream of liquid phase into the central stream of vapor, i. e., the tetraethyl lead and the ethyl chloride are stripped from the reaction mass. The mixture is discharged from the stripper tube into a chamber, usually a cyclone separator, where the vapor phase is separated from the liquid phase. The stripper tube, its mode of operation, the conditions required to produce the annular flow therein, and the means and methods for recovering the components of the mixture are described in more detail in the application of Rehm, Jr. and Wingate hereinbefore referred to.

For successful operation of the stripper tube, it is essential that the reaction mass be mixed with from 0.2 to about 5 parts by weight of water for each part of lead in the reaction mass, preferably from about 0.5 to about 4 parts by weight of water. Such water is required to provide a mixture which will be sufficiently fluid to permit its ready discharge from the tube. Materially more than 5 parts of water seriously decreases the recoveries of tetraethyl lead. Such water will contain a still aid in the proportion of from about 0.001 to about 1 part by weight for each part of lead in the reaction mass, as disclosed by Rehm, Jr. and Wingate in their application hereinbefore referred to. The water will be introduced into the stripper tube near the entrance thereof, and usually will be at about the temperature and at or slightly above the pressure of the reaction mass at the entrance of the stripper tube. Ordinarily, the water will be at from about 80° C. to about 140° C. and, preferably, at from about 120° C. to about 140° C.

It is also essential to mix the reaction mass with saturated steam to produce the desired flow conditions in the stripper tube, to produce and maintain the desired temperatures in the tube, and to vaporize the tetraethyl lead and the ethyl chloride and carry them out of the liquid phase into the vapor phase. For these purposes, the saturated steam should be at a temperature of from about 125° C. to about 188° C., preferably from about 170° C. to about 180° C., and should be introduced into the stripper tube in a proportion of from 0.09 to about 3 parts by weight for each part of ethyl chloride plus from 0.06 to about 2.4 parts by weight for each part of tetraethyl lead. Usually, the steam will be in a proportion of from about 0.3 to about 3 parts per part of ethyl chloride plus from about 0.24 to about 2.4 parts per part of tetraethyl lead, and preferably from about 0.3 to about 0.8 part per part of ethyl chloride plus from about 0.24 to 0.6 part per part of tetraethyl lead.

The mixture of reaction mass, water and steam at the entrance of the stripper tube should be at a temperature of from about 95° C. to about 150° C. and a pressure of from about 35 p. s. i. a. to 175 p. s. i. a., preferably at about 135° C. to about 140° C. and about 130 p. s. i. a. to about 145 p. s. i. a. Also, the pressure of the mixture at the entrance of the stripper tube must be less than the pressure at the body of the reaction mass, i. e. lower than the pressure in the temporary storage tank. Such difference in pressure normally should be at least ½ pound per square inch, and preferably should be from about 5 to about 10 pounds per square inch.

The body of reaction mass is connected to the entrance of the stripper tube solely by a feed pipe which has a smooth, unobstructed, uniform bore and is devoid of sharp bends. In other words, the feed pipe is a simple pipe without valves, pumps or other devices for controlling the flow therethrough or which would in any way alter the character of its bore. It should have a diameter of at least ¼ inch but not more than about 10 inches and should not have bends having a radius of curvature of less than 5 pipe diameters. Any bends in the pipe will normally have a radius of curvature of about 10 pipe diameters. Such pipe must be of a size, diameter and length, to offer resistance to flow of the reaction mass through it, so that there is a pressure drop through the pipe about equal to the difference between the pressure at the body of reaction mass and the pressure at the entrance of the stripper tube whereby the reaction mass will be discharged from the pipe at a pressure about equal to the desired pressure of the mixture of reaction mass, water and steam at the entrance of the stripper tube. In other words, the feed pipe must have a diameter such that the reaction mass flowing through it fills the bore of the pipe at the lowest rate of flow of the reaction mass to be employed; and must be of a length to produce a normal pressure drop of ½ or more pound per square inch, preferably a normal pressure drop of from about 5 to about 10 pounds per square inch. It will be apparent that the size of the feed pipe will depend primarily upon the scale of the operation and the pressure drop to be obtained, and hence that it is impossible to give the exact sizes of pipe for all cases. However, given the desired volumes and rates of flow of the reaction mass and the pressure drops to be obtained, any competent engineer can determine the required size of the feed pipe by well-known procedures.

During normal operation wherein a reactor discharges into a temporary storage tank or hold-up vessel, the depth of the body of reaction mass in the tank will fluctuate somewhat, usually by less than 5%. The rate of flow of the reaction mass through the feed pipe will fluctuate correspondingly in response to the variations in the hydrostatic pressure. The rate of flow of the reaction mass is maintained constant during such normal operation by adjusting the pressure at the entrance of the stripper tube to correspond with the variations in hydrostatic pressure so as to maintain the pressure drop through the feed pipe constant; increasing the rate of flow of the steam, the water or both to increase the pressure at the entrance of the stripper tube, and decreasing the rate of flow of the steam, the water or both to decrease the pressure at the entrance of the stripper tube. Preferably, such control of the flow of the reaction mass is accomplished solely by regulation of the rate of flow of the stem into the entrance of the stripper tube.

Such method of control is ordinarily sufficient and will be employed, so long as the level of the body of reaction mass is between predetermined limits which are dictated by safety considerations. Such limits correspond to an upper level safely below the top of the vessel containing the body of reaction mass, and a lower level slightly above the inlet end of the feed pipe and where the reaction mass can be effectively agitated, usually corresponding to from about ¼ to about ¾ of the depth of the vessel.

It frequently happens that the rate of discharge of the reaction mass from the reactor into the temporary storage tank or hold-up vessel becomes abnormal whereby the level of the body of reaction mass in the tank tends to rise above or fall below the predetermined safe limits. While such abnormal discharge from the reactor is temporary, it is of sufficiently long duration to constitute a serious hazard. Also, such abnormal discharge is usually at a rate greater or less than the rate at which the reaction mass will flow from the temporary storage tank through the feed pipe under the normal pressures at the entrance to the stripper tube, even when the flow of the reaction mass through the feed pipe is not maintained substantially constant as described in the two preceding paragraphs, and the effects of such abnormal flow are aggravated by such control of the rate of flow of the reaction mass from the temporary storage tank. Our invention is primarily concerned with a process for compensating for abnormal fluctuations in the depth of the body of reaction mass such as are caused by such abnormal discharge from the reactor.

When the discharge from the reactor is abnormally high so that the depth of the body of reaction mass tends to rise above the desired upper limit, the rate of flow of the reaction mass through the feed pipe is increased by reducing the pressure at the entrance of the stripper tube by decreasing the rate of flow of the steam, the water, or both into the entrance of the stripper tube. When the discharge from the reactor is abnormally low so that the depth of the body of reaction mass tends to fall below the desired lower limit, the rate of flow of the reaction mass through the feed pipe is decreased by increasing the pressure at the entrance of the stripper tube by increasing the rate of flow of the steam, the water, or both into the entrance of the stripper tube. In each case, the changed rate of flow of the reaction mass through the feed pipe is maintained until the depth of the body of reaction mass is brought to within the desired limits. By such method, the rate of flow of the reaction mass through the feed pipe can be increased or decreased to an extent of about 25% above or below its normal rate, which ordinarily will be sufficient to prevent the depth of the body of reaction mass from increasing or decreasing to such an extent as to require interruption of the process and will rapidly bring the depth of the body of reaction mass back to within the desired limits after the discharge from the reactor has returned to normal.

Preferably, the rate of flow of the reaction mass through the feed pipe is changed solely by regulation of the rate of flow of the steam into the entrance of the stripper tube. The range of proportions of water to reaction mass, required for proper and efficient operation of the stripper tube, particularly the preferred range, is quite narrow and critical. When the flow of water is changed in order to change the rate of flow of the reaction mass through the feed pipe, the flow pattern in the stripper tube will usually be changed, the recoveries of the tetraethyl lead will frequently be altered, and there is danger of obtaining proportions of water to reaction mass outside the required limits which will seriously affect the operation of the stripper tube, possibly rendering it inoperative. On the other hand, the ranges of proportions of steam to the reaction mass are quite broad, and temporary large excesses of steam do not seriously affect the operation of the stripper tube.

It is apparent that, when the flow of the reaction mass through the feed pipe is controlled by regulating the rate of flow of the steam into the entrance of the stripper tube, the ratio of steam to reaction mass at the entrance to the stripper tube will not always be constant, but may vary considerably. On the other hand, it is highly desirable to maintain such ratio constant so that the stripper tube and the separating apparatus can be operated smoothly and uniformly with a minimum of attention and adjustments.

According to the preferred mode of operation of our invention, we control the rate of flow of the reaction mass by regulation of the flow of steam into the entrance of the stripper tube and at the same time maintain the desired ratio of steam to reaction mass in the stripper tube. This is accomplished by introducing only a portion of the desired amount of steam into the entrance of the stripper tube and introducing the rest of the steam into the stripper tube at a point downstream from the entrance thereof. The point at which the rest of the steam is introduced should be sufficiently far from the entrance of the stripper tube as to have little or no effect on the pressure at the entrance of the tube, but sufficiently far from the discharge end of the stripper tube so that it can perform its desired function of vaporizing the ethyl chloride and the tetraethyl lead. Usually, during the normal operation, we introduce from about 50% to about 75% of the total amount of the steam into the entrance of the stripper tube and introduce the rest of the steam into the stripper tube at a point downstream from the entrance thereof at a distance equal to from about 5% to about 50% of the length of the tube. Preferably from about 50% to about 55% of the total amount of the steam will normally be introduced at the entrance of the stripper tube, and the rest of the steam will be introduced downstream at about 35% of the length of the tube.

When the rate of flow of the reaction mass through the feed pipe is to be increased, the proportion of the steam introduced into the entrance of the stripper tube will be decreased, to a minimum of about 25% of the total amount of the steam desired. Simultaneously, the amount of steam, introduced downstream from the entrance of the stripper tube will be increased so that the total amount of steam introduced at both points will be sufficient to maintain the desired ratio of steam to the reaction mass. Due to the fact that the rate of flow of the reaction mass into the stripper tube is increased, the total amount of steam will be greater than the amount employed under normal conditions. When the rate of flow of the reaction mass through the feed pipe is to be decreased, the proportion of the steam introduced into the entrance of the stripper will be increased, up to a maximum of 100% of the total amount of the steam desired. Simultaneously, the amount of steam, introduced downstream from the entrance of the stripper tube, will be decreased, down to a minimum of zero, so that the total amount of steam introduced at both points will be sufficient to maintain the desired ratio of steam to the reaction mass. In this latter case, the total amount of steam will be less than that employed under normal conditions, due to the fact that the rate of flow of reaction mass into the stripper tube is decreased. At the same time, the rate of flow of the water and the still aids will be regulated in conformity with any variations in the rate of flow of the reaction mass.

The rates of flow of the steam and the water may be regulated by manually operated valves and the like. However, in practice, the rates of flow of the water and the steam, into the entrance of the stripper tube and downstream from the entrance, are regulated automatically, as by differential pressure recorder-controllers which are actuated by the difference in pressure between the temporary storage tank and the entrance of the stripper tube, and are reset automatically by gross changes in the depth of the body of reaction mass in the temporary storage tank. Thus, a substantially constant flow of reaction mass through the feed pipe is maintained under normal conditions but, when the depth of the body of reaction mass in the temporary storage tank goes above or below the predetermined levels, the flow is reset at a somewhat higher or lower rate, as the case may be, in order to maintain or adjust it to the desired levels. Controllers, suitable for automatically regulating the flow of the steam and the water, are well-known to the art, are conventional, and are of various types and construction.

One form of apparatus, which is particularly adapted for carrying out the preferred embodiments of the process of our invention, is illustrated diagrammatically in the accompanying drawing. The vessel 10 is a temporary storage tank or holdup vessel which continually receives the reaction mass discharged from a reactor (not shown) and contains a body of the reaction mass which is continuously agitated by an agitator 11. A feed pipe 12 connects the body of the reaction mass to the entrance of an insulated stripper tube 14, and consists of a simple pipe having a smooth, unobstructed, uniform bore at least ¼ inch in diameter, and is devoid of sharp bends. The inlet end of the feed pipe 12 is positioned near the bottom of the vessel 10, below the lowest expected level of the body of the reaction mass, usually about ⅛ of the height of the vessel. The bend in the feed pipe has a radius of curvature equal to at least 5 pipe diameters, usually about 10 to about 12 pipe diameters.

A steam pipe 16, provided with a valve 18, is connected to the entrance of the stripper tube 14 adjacent the discharge end of the feed pipe 12. Conventionally, the end of the steam pipe is connected to one end of a T union, the end of the stripper tube being connected to the other end of the T union, and the discharge end of the feed pipe being connected to the side branch of the T union. A Venturi tube or other conventional type of union, having 3 branches, may be used in place of the T union. A by-pass line 20, provided with a valve 22, connects the steam pipe 16 with the stripper tube 14 at a point downstream from the entrance of the stripper tube at a distance equal to from about 5% to about 50% of the length of the stripper tube. A water supply pipe 24 is also connected to the stripper tube 14 near the entrance thereof. The valves 18 and 22 may be operated manually but, usually, will be automatically operated by instruments, not shown.

The discharge end of the stripper tube 14 is connected with a cyclone separator 26 where the vapor phase is separated from the liquid phase. The vapor phase, composed of steam, ethyl chloride and tetraethyl lead, passes off through line 28 to equipment, not shown, for separately recovering the ethyl chloride and the tetraethyl lead. The liquid phase flows out through line 30 to equipment, not shown, for separating the lead from the aqueous solution of the salt.

A typical form of automatic control means comprises a differential pressure recorder-controller 32 connected to a float 34 through a level indicator 36 and a line 38 which transmits the level readings to the recorder-controller. The recorder-controller is connected to the top of the storage vessel 10 by a pressure transmitting line 40 and to the entrance of the stripper tube 14 by a pressure transmitting line 42. Also, the recorder-controller is connected to the steam valve 18 through line 44, steam valve control 46 and line 48.

In order to more clearly illustrate our invention, preferred modes of carrying the same into effect, and the advantageous results to be obtained thereby, the following example is given, in which the parts are by weight except where otherwise specifically indicated:

*Example*

The apparatus, shown in the drawing, was employed, in which the stripper tube 14 was one inch in diameter and 100 feet long and in which the bends had a radius of curvature equal to about 10 tube diameters. The pipe 12 was a simple pipe having a diameter of ⅜ inch and a length of 15 feet and in which the bend had a radius of curvature of about 10 pipe diameters. The inlet end of the pipe was positioned above the bottom of the vessel at about ⅛ of the height of the vessel.

A reactor continually discharged a reaction mass into the temporary storage tank 10 to form an agitated body of reaction mass therein. Such reaction mass was composed of about 6.2% by weight of tetraethyl lead, about 5.1% sodium chloride, about 13.5% lead and about 75.2% ethyl chloride, and was at a temperature of about 94° C. and a pressure of about 155 pounds per square inch absolute.

The reaction mass was caused to flow from the tank 10 through pipe 12 to the stripper tube 14 at a normal rate of 15 pounds per minute. Water, containing 0.418% of sodium dichromate as a still aid, was introduced through pipe 24 at a temperature of about 130° C. and a pressure of about 150 pounds per square inch absolute and at a rate of about 1.67 pounds per minute. Saturated steam, at a temperature of about 180° C., was introduced into the stripper tube at a normal rate of 6 pounds per minute, about half of the steam being introduced at the entrance of the stripper tube and about half being passed through the by-pass line and introduced into the stripper tube about 35 feet downstream from the entrance thereof.

The pressure at the entrance to the stripper tube was normally about 150 pounds per square inch absolute. The flow through the stripper tube was annular, the vapor velocity being in the range of from about 200 to about 300 feet per second and the liquid velocity being in the range of from about 1.5 to about 2.5 feet per second. The material, at the exit of the stripper tube, was at a temperature of about 130° C. and a pressure of about 65 pounds per square inch absolute. The discharge from the stripper tube consisted of about 73.6% by weight of vapor (about 16.67 pounds per minute), containing almost all of the ethyl chloride and tetraethyl lead, and about 26.4% by weight of liquid phase (about 6.0 pounds per minute, composed of 1 lb. sodium chloride, 2.66 lbs. lead and 2.34 lbs. water) containing small amounts of entrained vapor.

Most of the time, the depth of the reaction mass in the tank fluctuated somewhat between about ¼ to about ¾ of the height of the tank, usually by less than 5%. The feed of reaction mass was maintained substantially constant by regulating the steam feed into the entrance of the stripper tube so as to vary the pressure at such entrance, the steam feed being increased to increase the pressure as the depth of the body of reaction mass increased, and the steam feed being decreased to reduce the pressure as the depth of the body of reaction mass decreased.

At times, the rate of discharge of the reaction mass into the tank 10 temporarily exceeded to a material extent the rate at which the reaction mass was being withdrawn from the tank, so that the level of the reaction mass rose dangerously close to the top of the tank. At other times, the reverse occurred. At such times, it was necessary to increase or to decrease the rate at which the reaction mass was being withdrawn from the tank. For example, when the depth of the body of reaction mass increased to a dangerous level (above ¾ of the height of the tank), the feed rate of the reaction mass from the tank was increased by 10%, from 15 lb./min. to 16.5 lb./min., by decreasing the amount of steam introduced into the entrance of the stripper tube from about ½ of the total steam flow to about ¼ of the total steam flow, resulting in a reduction of the pressure at the entrance of the stripper tube from 150 p. s. i. a. to 148 p. s. i. a. Simultaneously, the ratio of steam to the tetraethyl lead and the ethyl chloride was maintained constant by increasing the flow of steam through the by-pass line from about ½ to about ¾ of the total amount of the steam and by increasing the total amount of steam from 6 lb./min. to 6.5 lb./min. When the level of the body of reaction mass fell below about ¼ the height of the tank, the procedure was reversed; that is, the proportion of the steam introduced into the entrance of the stripper tube was increased, in some cases, up to 100% of the total amount of the steam so as to increase the pressure at the entrance of the stripper tube and decrease the rate of flow of the reaction mass. The adjustments of the steam flow were made automatically by instrument controls.

While the rate of flow of the reaction mass from the tank 10 to the stripper tube 14 preferably is controlled through regulation of the flow of steam into the entrance of the stripper tube as illustrated by the preceding example, it may be and has been controlled successfully by regulation of the flow of water into the entrance of the stripper tube. In such case, the by-pass line 20 may be eliminated. For example, if it is desired to decrease the rate of flow of the reaction mass in the preceding example by regulation of the flow of water instead of steam, an additional 2 gallons per minute of water may be introduced through the water pipe 24 (making a total of 1.67 + 16.68 or 18.35 lb./min. of water), whereby the pressure at the entrance of the stripper tube would be increased by about 2 pounds and the rate of flow of reaction mass to the stripper tube would be decreased by about 10%, from 15 lb./min. to 13.5 lb./min. At the same time, the total amount of steam should be decreased from 6.0 lb./min. to 5.5 lb./min., so as to maintain a constant ratio of steam to tetraethyl lead and ethyl chloride. Such increase in the amount of water, so used to control the rate of flow of the reaction mass, would reduce the recovery of the tetraethyl lead from the reaction mass from about 98% to about 95%, and still larger amounts of water would further reduce the recoveries of tetraethyl lead.

It will be understood that the preceding example and the drawing are given for illustrative purposes solely, and that our invention is not limited to the specific embodiments described and shown therein. On the other hand, the apparatus, the temperatures, the pressures, the proportions, and the other conditions and mode of operation may be widely varied within the limits set forth, without departing from the spirit or scope of our invention.

It will be apparent that, by our invention, we have provided a simple, economical, and readily operated method for controlling the flow of the reaction mass from a body thereof which fluctuates in depth without imposing any mechanical restraints thereon, and especially for controlling such flow and compensating for abnormal fluctuations in the depth of the body of reaction mass. More particularly, we have provided an effective process for controlling the depth of the body of reaction mass in the temporary storage tank and the flow thereof to the stripper tube in the process of Rehm, Jr. and Wingate in their application Serial No. 272,454. Accordingly, it will be apparent that our invention constitutes a valuable advance in and contribution to the art.

We claim:

1. In the process wherein there is produced and maintained a body of reaction mass consisting essentially of 1 part of liquid tetraethyl lead, from about 1.95 to about 2.4 parts of finely-divided lead, from about 0.7 to about 0.9 part of sodium chloride, and from about 5 to about 20 parts of liquid ethyl chloride at a temperature of from about 80° C. to about 127° C. and at a pressure of from about 107 to about 290 pounds per square inch absolute, which body of reaction mass fluctuates in depth, and such reaction mass is continuously withdrawn from such body thereof and fed to a stripper tube where it is mixed with from 0.2 to about 5 parts of water for each part of lead, and with saturated steam at a temperature of from about 125° C. to about 188° C. in a proportion of from 0.09 to about 3 parts for each part of ethyl chloride plus from 0.06 to about 2.4 parts for each part of tetraethyl lead, and the mixture is caused to flow through the stripper tube under conditions of annular flow; the improvement which consists essentially of continuously flowing such reaction mass from such body thereof to the entrance of the stripper tube solely through a feed pipe which has a smooth, unobstructed, uniform bore and is devoid of sharp bends; regulating the rate of flow of the steam and the water so that the pressure at the entrance to the stripper tube is maintained in the range of from about 35 to about 175 pounds per square inch absolute but less than the pressure at the body of reaction mass; and varying the rate of flow of the reaction mass through the feed pipe to an extent of up to about 25% whenever the depth of the body of reaction mass falls outside of desired limits by adjusting the pressure at the entrance of the stripper tube through variation in the rate of flow of at least one member of the group consisting of the steam and the water until the depth of the body of reaction mass is brought to within the desired limits.

2. In the process wherein there is produced and maintained a body of reaction mass consisting essentially of 1 part of liquid tetraethyl lead, from about 1.95 to about 2.4 parts of finely-divided lead, from about 0.7 to about 0.9 part of sodium chloride, and from about 5 to about 20 parts of liquid ethyl chloride at a temperature of from about 80° C. to about 127° C. and at a pressure of from about 107 to about 290 pounds per square inch absolute, which body of reaction mass fluctuates in depth, and such reaction mass is continuously withdrawn from such body thereof and fed to a stripper tube where it is mixed with from 0.2 to about 5 parts of water for each part of lead, and with saturated steam at a temperature of from about 125° C. to about 188° C. in a proportion of from 0.09 to about 3 parts for each part of ethyl chloride plus from 0.06 to about 2.4 parts for each part of tetraethyl lead, and the mixture is caused to flow through the stripper tube under conditions of annular flow; the improvement which consists essentially of continuously flowing such reaction mass from such body thereof to the entrance of the stripper tube solely through a feed pipe which has a smooth, unobstructed, uniform bore and is devoid of sharp bends; regulating the rate of flow of the steam and the water so that the pressure at the entrance to the stripper tube is maintained in the range of from about 35 to about 175 pounds per square inch absolute but less than the pressure at the body of reaction mass and maintaining the rate of flow of the reaction mass through the feed pipe approximately constant by adjusting the pressure at the entrance of the stripper tube, in response to variations in the depth of the body of reaction mass between desired limits, through variation in the rate of flow of at least one member of the group consisting of the steam and the water; and varying the rate of flow of the reaction mass through the feed pipe to an extent of up to about 25% whenever the depth of the body of reaction mass falls outside of desired limits by further adjusting the pressure at the entrance of the stripper tube through variation in the rate of flow of at least one member of the group consisting of the steam and the water until the depth of the body of reaction mass is brought to within the desired limits.

3. In the process wherein there is produced and maintained a body of reaction mass consisting essentially of 1 part of liquid tetraethyl lead, from about 1.95 to about 2.4 parts of finely-divided lead, from about 0.7 to about 0.9 part of sodium chloride, and from about 5 to about 20 parts of liquid ethyl chloride at a temperature of from about 80° C. to about 127° C. and at a pressure of from about 107 to about 290 pounds per square inch absolute, which body of reaction mass fluctuates in depth, and such reaction mass is continuously withdrawn from such body thereof and fed to a stripper tube where it is mixed with from 0.2 to about 5 parts of water for each part of lead, and with saturated steam at a temperature of from about 125° C. to about 188° C. in a proportion of from 0.09 to about 3 parts for each part of ethyl chloride plus from 0.06 to about 2.4 parts for each part of tetraethyl lead, and the mixture is caused to flow through the stripper tube under conditions of annular flow; the improvement which consists essentially of continuously flowing such reaction mass from such body thereof to the entrance of the stripper tube solely through a feed pipe which has a smooth, unobstructed, uniform bore and is devoid of sharp bends; regulating the rate of flow of the steam and the water so that the pressure at the entrance to the stripper tube is maintained in the range of from about 35 to about 175 pounds per square inch absolute but less than the pressure at the body of reaction mass; and varying the rate of flow of the reaction mass through the feed pipe to an extent of up to about 25% whenever the depth of the body of reaction mass falls below or rises above the desired limits by further adjusting the pressure at the entrance of the stripper tube through variation in the rate of flow of the steam until the depth of the body of reaction mass is brought to within the desired limits.

4. In the process wherein there is produced and maintained a body of reaction mass consisting essentially of 1 part of liquid tetraethyl lead, from about 1.95 to about 2.4 parts of finely-divided lead, from about 0.7 to about 0.9 part of sodium chloride, and from about 5 to about 20 parts of liquid ethyl chloride at a temperature of from about 80° C. to about 127° C. and at a pressure of from about 107 to about 290 pounds per square inch absolute, which body of reaction mass fluctuates in depth, and such reaction mass is continuously withdrawn from such body thereof and fed to a stripper tube where it is mixed with from 0.2 to about 5 parts of water for each part of lead, and with saturated steam at a temperature of from about 125° C. to about 188° C. in a proportion of from 0.09 to about 3 parts for each part of ethyl chloride plus from 0.06 to about 2.4 parts for each part of tetraethyl lead, and the mixture is caused to flow through the stripper tube under conditions of annular flow; the improvement which consists essentially of continuously flowing such reaction mass from such body thereof to the entrance of the stripper tube solely through a feed pipe which has a smooth, unobstructed, uniform bore and is devoid of sharp bends; regulating the rate of flow of the steam and the water so that the pressure at the entrance to the stripper tube is maintained in the range of from about 35 to about 175 pounds per square inch absolute but less than the pressure at the body of reaction mass; and increasing the rate of flow of the reaction mass through the feed pipe to an extent of up to about 25% whenever the depth of the body of reaction mass rises above a desired upper limit by reducing the pressure at the entrance of the stripper tube through decrease in the rate of flow of the steam, and decreasing the rate of flow of the reaction mass through the feed pipe to an extent of up to about 25% whenever the depth of the body of reaction mass falls below a desired lower limit by increasing the pressure at the entrance of the stripper tube through increase in the rate of flow of the steam, until the deph of the body of reaction mass is brought to within the desired limits.

5. In the process wherein there is produced and maintained a body of reaction mass consisting essentially of 1 part of liquid tetraethyl lead, from about 1.95 to about 2.4 parts of finely-divided lead, from about 0.7 to about 0.9 part of sodium chloride, and from about 5 to about 20 parts of liquid ethyl chloride at a temperature of from about 80° C. to about 127° C. and at a pressure of from about 107 to about 290 pounds per square inch absolute, which body of reaction mass fluctuates in depth, and such reaction mass is continuously withdrawn from such body thereof and fed to a stripper tube where it is mixed with from 0.2 to about 5 parts of water for each part of lead, and with saturated steam at a temperature of from about 125° C. to about 188° C. in a proportion of from 0.09 to about 3 parts for each part of ethyl chloride plus from 0.06 to about 2.4 parts for each part of tetraethyl lead, and the mixture is caused to flow through the stripper tube under conditions of annular flow; the improvement which consists essentially of continuously flowing such reaction mass from such body thereof to the entrance of the stripper tube solely through a feed pipe which has a smooth, unobstructed, uniform bore and is devoid of sharp bends; regulating the rate of flow of the steam and the water so that the pressure at the entrance to the stripper tube is maintained in the range of from about 35 to about 175 pounds per square inch absolute but less than the pressure at the body of reaction mass and maintaining the rate of flow of the reaction mass through the feed pipe approximately constant by adjusting the pressure at the entrance of the stripper tube, in response to variations in the depth of the body of reaction mass between desired limits, through variation in the rate of flow of the steam; and varying the rate of flow of the reaction mass through the feed pipe to an extent of up to about 25% whenever the depth of the body of reaction mass falls outside of desired limits by further adjusting the pressure at the entrance of the stripper tube through variation in the rate of flow of the steam until the depth of the body of reaction mass is brought to within the desired limits.

6. In the process wherein there is produced and maintained a body of reaction mass consisting essentially of 1 part of liquid tetraethyl lead, from about 1.95 to about 2.4 parts of finely-divided lead, from about 0.7 to about 0.9 part of sodium chloride, and from about 5 to about 20 parts of liquid ethyl chloride at a temperature of from about 80° C. to about 127° C., and at a pressure of from about 107 to about 290 pounds per square inch absolute, which body of reaction mass fluctuates in depth, and such reaction mass is continuously withdrawn from such body thereof and fed to a stripper tube where it is mixed with from 0.2 to about 5 parts of water for each part of lead, and with saturated steam at a temperature of from about 125° C. to about 188° C. in a proportion of from 0.09 to about 3 parts for each part of ethyl chloride plus from 0.06 to about 2.4 parts for each part of tetraethyl lead, and the mixture is caused to flow through the stripper tube under conditions of annular flow; the improvement which consists essentially of continuously flowing such reaction mass from such body thereof to the entrance of the stripper tube solely through a feed pipe which has a smooth, unobstructed, uniform bore and is devoid of sharp bends; regulating the rate of flow of the steam and the water so that the pressure at the entrance to the stripper tube is maintained in the range of from about 35 to about 175 pounds per square inch absolute but less than the pressure at the body of reaction mass and maintaining the rate of flow of the reaction mass through the feed pipe approximately constant by adjusting the pressure at the entrance of the stripper tube, in response to variations in the depth of the body of reaction mass between desired limits, through variation in the rate of flow of the steam; and increasing the rate of flow of the reaction mass through the feed pipe to an extent of up to about 25% whenever the depth of the body of reaction mass rises above a desired upper limit by reducing the pressure at the entrance of the stripper tube through decrease in the rate of flow of the steam, and decreasing the rate of flow of the reaction mass through the feed pipe to an extent of up to about 25% whenever the depth of the body of reaction mass falls below a desired lower limit by increasing the pressure at the entrance of the stripper tube through increase in the rate of flow of the steam, until the depth of the body of reaction mass is brought to within the desired limits.

7. In the process wherein there is produced and maintained a body of reaction mass consisting essentially of 1 part of liquid tetraethyl lead, from about 1.95 to about 2.4 parts of finely-divided lead, from about 0.7 to about 0.9 part of sodium chloride, and from about 5 to about 20 parts of liquid ethyl chloride at a temperature of from about 80° C. to about 127° C. and at a pressure of from about 107 to about 290 pounds per square inch absolute, which body of reaction mass fluctuates in depth, and such reaction mass is continuously withdrawn from such body thereof and fed to a stripper tube where it is mixed with from 0.2 to about 5 parts of water for each part of lead, and with saturated steam at a temperature of from about 125° C. to about 188° C. in a proportion of from 0.09 to about 3 parts for each part of ethyl chloride plus from 0.06 to about 2.4 parts for each part of tetraethyl lead, and the mixture is caused to flow through the stripper tube under conditions of annular flow; the improvement which consists essentially of continuously flowing such reaction mass from such body thereof to the entrance of the stripper tube solely through a feed pipe which has a smooth, unobstructed, uniform bore and is devoid of sharp bends; normally introducing from about 50% to about 75% of the total amount of the steam into the entrance of the stripper tube and the rest of the steam into the stripper tube at a point downstream from the entrance thereof at a distance equal to from about 5% to about 50% of the length of the tube; regulating the rate of flow of the steam and the water so that the pressure at the entrance to the stripper tube is maintained in the range of from about 35 to about 175 pounds per square inch absolute but less than the pressure at the body of reaction mass; and varying the rate of flow of the reaction mass through the feed pipe to an extent of up to about 25% whenever the depth of the body of reaction mass falls outside of desired limits by adjusting the pressure at the entrance of the stripper tube through variation in the rate of flow of the steam into the entrance of the tube until the depth of the body of reaction mass is brought to within the desired limits.

8. In the process wherein there is produced and maintained a body of reaction mass consisting essentially of 1 part of liquid tetraethyl lead, from about 1.95 to about 2.4 parts of finely-divided lead, from about 0.7 to about 0.9 part of sodium chloride, and from about 5 to 20 parts of liquid ethyl chloride at a temperature of from about 80° C. to about 127° C. and at a pressure of from about 107 to about 290 pounds per square inch absolute, which body of reaction mass fluctuates in depth, and such reaction mass is continuously withdrawn from such body thereof and fed to a stripper tube where it is mixed with from 0.2 to about 5 parts of water for each part of lead, and with saturated steam at a temperature of from about 125° C. to about 188° C. in a proportion of from 0.09 to about 3 parts for each part of ethyl chloride plus from 0.06 to about 2.4 parts for each part of tetraethyl lead, and the mixture is caused to flow through the stripper tube under conditions of annular flow; the improvement which consists essentially of continuously flowing such reaction mass from such body thereof to the entrance of the stripper tube solely through a feed pipe which has a smooth, unobstructed, uniform bore and is devoid of sharp bends; normally introducing from about 50% to about 75% of the total amount of the steam into the entrance of the stripper tube and the rest of the steam into the stripper tube at a point downstream from the entrance thereof at a distance equal to from about 5% to about 50% of the length of the tube; regulating the rate of flow of the steam and the water so that the pressure at the entrance to the stripper tube is maintained in the range of from about 35 to about 175 pounds per square inch absolute but less than the pressure at the body of reaction mass; and increasing the rate of flow of the reaction mass through the feed pipe to an extent of up to about 25% whenever the depth of the body of reaction mass rises above a desired upper limit by reducing the pressure at the entrance of the stripper tube through decrease in the rate of flow of the steam into the entrance of the stripper tube, and decreasing the rate of flow of the reaction mass through the feed pipe to an extent of up to about 25% whenever the depth of the body of reaction mass falls below a desired lower limit by increasing the pressure at the entrance of the stripper tube through increase in the rate of flow of the steam into the entrance of the stripper tube, until the depth of the body of reaction mass is brought to within the desired limits, and simultaneously adjusting the amount of steam introduced into the stripper tube downstream from the entrance thereof so as to maintain substantially constant the proportion of the total amount of steam to the reaction mass.

9. In the process wherein there is produced and maintained a body of reaction mass consisting essentially of 1 part of finely-divided lead, from about 0.7 to about 0.9 part of sodium chloride, and from about 5 to about 20 parts of liquid ethyl chloride at a temperature of from about 80° C. to about 127° C. and at a pressure of from about 107 to about 290 pounds per square inch absolute, which body of reaction mass fluctuates in depth, and such reaction mass is continuously withdrawn from such body thereof and fed to a stripper tube where it is mixed with from 0.2 to about 5 parts of water for each part of lead, and with saturated steam at a temperature of from about 125° C. to about 188° C. in a proportion of from 0.09 to about 3 parts for each part of ethyl chloride plus from 0.06 to about 2.4 parts for each part of tetraethyl lead, and the mixture is caused to flow through the stripper tube under conditions of annular flow; the improvement which consists essentially of continuously flowing such reaction mass from such body thereof to the entrance of the stripper tube solely through a feed pipe which has a smooth, unobstructed, uniform bore and is devoid of sharp bends; normally introducing from about 50% to about 75% of the total amount of the steam into the entrance of the stripper tube and the rest of the steam into the stripper tube at a point downstream from the entrance thereof at a distance equal to from about 5% to about 50% of the length of the tube; regulating the rate of flow of the steam and the water so that the pressure at the entrance to the stripper tube is maintained in the range of from about 35 to about 175 pounds per square inch absolute but less than the pressure at the body of reaction mass and maintaining the rate of flow of the reaction mass through the feed pipe approximately constant by adjusting the pressure at the entrance of the stripper tube, in response to variations in the depth of the body of reaction mass between desired limits, through variation in the rate of flow of the steam into the entrance of the stripper tube; and increasing the rate of flow of the reaction mass through the feed pipe to an extent up to about 25% whenever the depth of the body of reaction mass rises above a desired upper limit by reducing the pressure at the entrance of the stripper tube through decrease in the rate of flow of the steam into the entrance of the stripper tube, and decreasing the rate of flow of the reaction mass through the feed pipe to an extent of up to about 25% whenever the depth of the body of reaction mass falls below a desired lower limit by increasing the pressure at the entrance of the stripper tube through increase in the rate of flow of the steam into the entrance of the stripper tube, until the depth of the body of reaction mass is brought to within the desired limits, and simultaneously adjusting the amount of steam introduced into the stripper tube downstream from the entrance thereof so as to maintain substantially constant the proportion of the total amount of steam to the reaction mass.

References Cited in the file of this patent

UNITED STATES PATENTS

| Number | Name | Date |
| --- | --- | --- |
| 2,059,142 | Purdie | Oct. 27, 1936 |
| 2,467,769 | Morrow | Apr. 19, 1949 |
| 2,510,373 | Bradley | June 6, 1950 |
| 2,574,759 | Rodekohr | Nov. 13, 1951 |
| 2,615,907 | Stanton | Oct. 28, 1952 |